United States Patent [19]

Sumner et al.

[11] 4,026,514
[45] May 31, 1977

[54] PRESSURE ENHANCED BUTTERFLY VALVE

[76] Inventors: Joe D. Sumner, 6903 Alderney Drive, Houston, Tex. 77055; Carlton H. Stanley, 2002 Cobble Creek Drive, Houston, Tex. 77090

[22] Filed: Mar. 8, 1976

[21] Appl. No.: 664,527

[52] U.S. Cl. .............................. 251/152; 251/171; 251/173
[51] Int. Cl.² ........................................ F16K 51/00
[58] Field of Search .................... 251/152, 171, 173

[56] References Cited

UNITED STATES PATENTS

| | | | |
|---|---|---|---|
| 2,488,380 | 11/1949 | Danks | 251/173 |
| 2,911,184 | 11/1959 | Moore | 251/173 |
| 3,095,177 | 6/1963 | Muller | 251/173 |
| 3,722,856 | 3/1973 | Koch | 251/152 |
| 3,986,699 | 10/1976 | Wucik | 251/173 |

*Primary Examiner*—Harold Weakley
*Attorney, Agent, or Firm*—James L. Jackson

[57] ABSTRACT

A high-pressure butterfly valve having pressure enhanced sealing which comprises a valve body defined by a pair of interfitting body plates that are retained in assembly by bolts that also secure the valve mechanism into a flow line. The interfitting valve plates also cooperate to define a seal recess within which is received an annular sealing element that provides a peripheral seal about a butterfly disc that is rotatably supported within a flow passage defined by the valve body plates. The annular sealing element also includes a pressure-responsive portion that is energized by pressure upstream of the butterfly element and which is directly responsive to pressure to urge the sealing portion thereof into sealing engagement with the periphery of the butterfly element. The valve body is so constructed that the downstream plate thereof may be secured in assembly with the upstream plate by bolts extending through an upstream pipe flange, thereby allowing the valve mechanism to be employed in the absence of any abutting relationship with a downstream pipe flange. The pressure enhancing feature of the annular sealing element also induces pressure enhanced sealing about a valve stem and trunnion that support the butterfly element for rotation within the flow passage of the valve.

19 Claims, 3 Drawing Figures

PRESSURE ENHANCED BUTTERFLY VALVE

FIELD OF THE INVENTION

This invention relates generally to the control of a flowing fluid medium by a valve element and more specifically relates to a butterfly valve mechanism having a valve disc or butterfly that may be rotated between open and closed positions within a flow passage. Even more specifically, this invention relates to a pressure enhanced butterfly valve mechanism wherein an annular sealing element is disposed about the periphery of a butterfly valve element of the valve mechanism and is enhanced by the pressure of the fluid medium controlled thereby so as to cause the sealing ability of the valve to increase in direct response to increases in pressure of the fluid medium that is controlled by the valve. This invention also relates generally to butterfly valve mechanisms that are capable of being employed at the downstream extremity of a flanged pipe section to provide a closure for such downstream pipe section.

BACKGROUND OF THE INVENTION

Butterfly valves have historically been low pressure valves that are typically utilized when the fluid pressure conditions to be encountered are of nominal nature. Butterfly valves have also been typically utilized in the past under conditions where a nominal amount of leakage is acceptable. It is quite difficult to provide a butterfly valve mechanism having an annular sealing element that is capable of providing a positive seal about the periphery of a butterfly valve element in the closed position thereof. The trunnion sealing elements of many butterfly valve mechanisms also fail to provide an adequate seal and thereby cause a significant leakage problem.

Split valve bodies are incorporated into many different types of mechanisms but in the case of butterfly valves, although split bodies are utilized to some degree, it is difficult to provide an efficiently designed split body assembly. Since the butterfly element must be supported by stem and trunnion devices, a body joint that intersects the stem and trunnion openings of the valve body will typically create stem and trunnion leakage problems that are difficult to overcome. It is therefore typical in the industry to provide integral valve body structures or, in the alternative, to provide valve body joints on a bias so that the stem and trunnion openings are not intersected. This of course adds materially to the cost of machining the butterfly valve body and therefore materially affects the market price of valves so manufactured.

THE PRIOR ART

Split valve body arrangements are exemplified by U.S. Pat. Nos. 3,080.145 to Swain and 3,752,181 to Morris, et al. Valves including pressure enhanced sealing include U.S. Pat. Nos. 1,844,641 to Dewein and 3,208,718 to White. Butterfly valves with pressure enhanced sealing are exemplified by U.S. Pat. Nos. 1,834,988 of White, 3,250,510 of Williams, and 3,550,906 of Mayers.

It is a primary object of the present invention to provide a novel, high-pressure butterfly valve construction utilizing a split body design with the valve body being split in such manner as to define a joint that extends through the stem and trunnion of the valve structure.

It is also an object of the present invention to provide a novel butterfly valve construction employing a split body structure that is adapted to be interposed between a pair of pipe flanges and to be held in assembly by a bolt extending through the pipe flanges and the valve body.

It is also a feature of the present invention to provide a novel butterfly valve construction employing a split valve body construction wherein the split valve body may be secured in assembly with a single downstream pipe flange by threaded bolts, thereby providing a valved closure at the downstream extremity of the pipe section.

Among the several features of the present invention is noted the contemplation of a novel butterfly valve construction incorporating an annular sealing element that engages the periphery of a rotatable butterfly valve element in the closed position thereof to provide a pressure enhanced seal that is responsive to line pressure to enhance the sealing ability of the valve.

It is also an important feature of the present invention to provide a novel butterfly valve construction incorporating a sealing element that seals about the periphery of a butterfly valve element in the closed position thereof and which includes a major portion thereof retained within an annular groove that is so constructed as to prevent material extrusion of the sealing element into the flow passage of the valve.

It is an even further feature of the present invention to provide a novel high pressure butterfly valve construction incorporating an annular sealing element for sealing about the periphery of a rotatable butterfly element of the valve and which includes pressure enhanced stem and trunnion sealing portions that are enhanced by line pressure to prevent leakage along the stem and trunnion.

Another important feature of the present invention contemplates the provision of a novel pressure enhanced butterfly valve construction incorporating a sealing element that provides sealing contact with the periphery of a rotatable butterfly valve element in the closed position of the valve and which also provides a seal for the joint of a split valve body of the valve construction.

It is also a feature of the present invention to provide a novel pressure enhanced butterfly valve construction that is of simple design, is low in cost and reliable in use.

Other and further features, advantages and objects of the present invention will become apparent to one skilled in the art upon full consideration of the present disclosure. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may conveniently take the form of a two-piece split valve body that is adapted to be interposed between the flanges of a pair of flanged pipe sections and which is maintained in position by bolts that extend both through the flanges and through mating bolt apertures formed in the valve body construction. The split valve body is defined by a pair of body plates that are of generally circular disc-like configuration and are formed to define semi-cylindrical stem and trunnion receptacles that define stem and trunnion passages when the body sections are placed in assembly. The annular disc-like body plates are also machined to define annular grooves that interfit to define an annular seal chamber within which may be received an annular sealing element to establish sealing about the periphery of a butterfly valve disc in the closed position thereof. An annular sealing portion of the sealing element extends through an internal groove defined by the valve body construction for engagement with the sealing surface of the disc. The configuration of the groove and sealing element is such that a major base portion of the sealing element is retained within an enlarged seal chamber and is prevented by annular shoulders from being extruded into the flow passage by the pressure of the fluid controlled by the valve. At least one of the valve body plates is formed to define pressure-introducing passages that conduct upstream line pressure through the valve body construction into the annular seal chamber, thereby allowing line pressure to act upon the sealing element in such manner as to urge the sealing portion thereof into sealing engagement with the periphery of the valve disc. As pressure increases, the sealing ability of the sealing element is enhanced in direct proportion thereto. The base portion of the sealing element is of generally U-shaped cross-sectional configuration defining an annular cup that faces upstream and receives the pressure introduced through the pressure introduction passages. An outer peripheral portion of the cup-like U-shaped base portion of the sealing element cooperates with each of the valve body plates to define seals therewith and prevent any leakage in the joint established between the assembled valve body plates.

The annular sealing element of the valve mechanism is also formed to define stem and trunnion sealing portions that are also acted upon by line pressure that is introduced into the annular seal chamber. Line pressure acting upon the stem and trunnion sealing portions enhances the sealing ability of the stem and trunnion sealing portions in direct response to the magnitude of line pressure. The downstream one of the body plates is formed to define threaded openings through which the bolts extend that retain the valve body in assembly between the flanges of the pipe. In the event it is desired to utilize the valve as a downstream closure for a flanged pipe section, threaded bolts may be extended through a single flange of a pipe section through the apertures of the upstream valve body plate and may be threaded into the downstream valve body plate to serve to retain both of the plates in assembly with the single pipe flange. In this manner, the butterfly valve mechanism serves efficiently to provide a closure at the downstream extremity of a pipe section.

BRIEF DESCRIPTION OF THE DRAWINGS

So that the manner in which the above recited features, advantages and objects of the present invention, as well as others which will become apparent, are attained and can be understood in detail, more particular description of the invention briefly summarized above may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

In the drawings:

Figure 1:
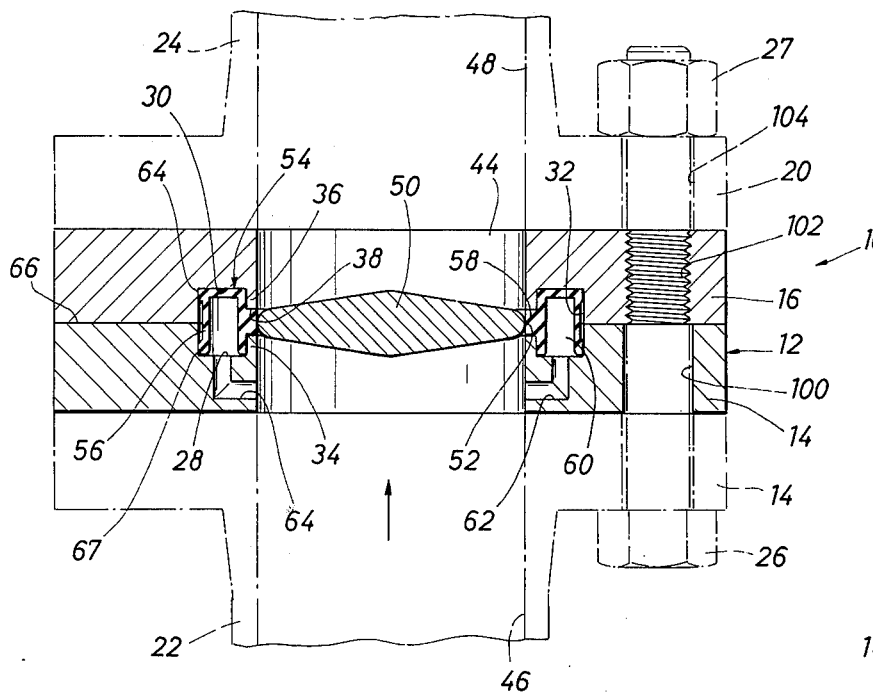
Figure 2:
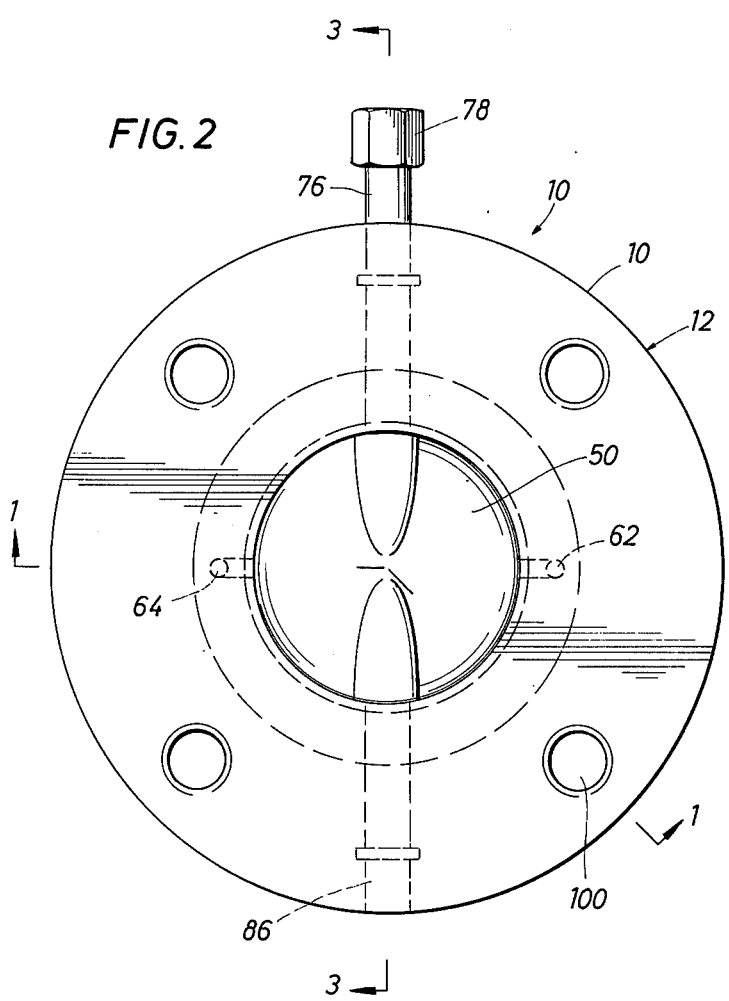

FIG. 1 is a sectional view taken along line 1—1 of FIG. 2 of a butterfly valve mechanism constructed in accordance with the present invention and showing a pair of body plates that cooperate to retain an annular sealing element therebetween. The downstream valve body plate is also illustrated as defining internal threads that may receive the threads of a threaded bolt. Flanges are shown in broken line between which the valve mechanism may be positioned.

FIG. 2 is an elevational view of the valve body structure of FIG. 1 illustrating the bolt openings and the valve disc. The valve stem and trunnion are at least partially shown in broken line.

Figure 3:
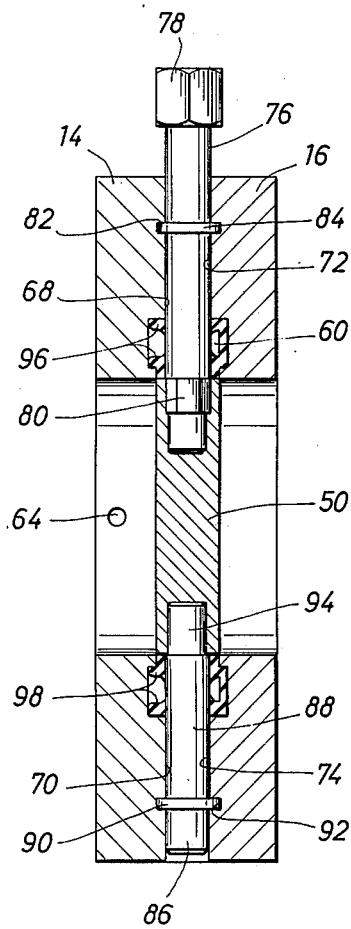

FIG. 3 is a sectional view taken along line 3—3 of FIG. 2 and illustrating the configuration of the stem and trunnion sealing portions of the sealing element in detail.

DESCRIPTION OF PREFERRED EMBODIMENT

Referring now to the drawings and first to FIG. 1, there is shown a valve construction generally at 10 including a split valve body shown generally at 12 that incorporates upstream and downstream valve body plates 14 and 16, respectively. The valve body plates are adapted to be assembled as shown in FIG. 1 between flanges 18 and 20 of upstream and downstream pipe sections 22 and 24, respectively, shown in broken line. Bolts or threaded studs shown at 26 may be employed to retain the valve body plates in assembly and also to retain the valve mechanism between the flanges of the pipe sections.

It is desirable to provide a pressure-responsive butterfly valve mechanism having a sealing ability that is enhanced by line pressure. Such may be conveniently accomplished in the manner illustrated particularly in FIG. 1, where the upstream and downstream valve plates 14 and 16 are shown to be formed to define annular grooves 28 and 30 that cooperate to define an annular seal chamber 32. The seal chamber 32 is defined when the upstream and downstream valve plates are placed in assembly, such as shown in FIGS. 1 and 3. Opposed annular flanges 34 and 36 of the upstream and downstream valve body plates cooperate to define a restricted annular opening 38. The valve body plates are each formed to define a centrally located aperture such as shown at 42 and 44, with such apertures being disposed in registry and defining a flow passage that is in turn positioned in registry with the bores 46 and 48 of the pipe sections.

Located within the flow passage of the valve is a valve plate or butterfly disc 50 having a peripheral sealing portion 52 that is positionable in registry with the annular seal opening 38. The valve disc 50 is rotatable from the closed position in FIG. 1, where it is positioned in substantially normal relation to the path of flow through the valve, to an open position where the disc is rotated substantially 90° from the position illustrated in FIG. 1 where it becomes substantially aligned with the path of fluid flow.

Within the annular seal chamber or pocket may be located an annular seal element illustrated generally at 54 which includes a relatively large base portion 56 and a relatively small annular sealing portion 58. With the sealing element 54 in position within the annular seal chamber, the annular sealing portion 58 extends through the annular opening defined between the flanges 34 and 36 and is disposed for sealing contact with the peripheral sealing portion 52 of the butterfly disc 50. In the uncompressed or unpressurized state of the valve mechanism, the sealing portion 58 of the annular seal establishes light mechanical sealing contact with the peripheral sealing portion 52 of the disc in the closed position thereof, thereby providing an initial seal. This light mechanical seal allows the valve element to be quite freely rotated between the open and closed positions thereof. The annular base portion 56 of the seal element 54 is of generally U-shaped cross-section defining an annular groove 60 that faces upstream and is in communication with fluid pressure upstream of the butterfly valve element 50 by means of a plurality of pressure-communicating passages 62 and 64 that are defined in the upstream valve body plate 14. The pressurized fluid medium is introduced into the annular seal groove 60 by means of the passages 62 and 64 and induces pressure-responsive forces to bear upon the interior of the base portion of the sealing element. This pressure responsive force urges the sealing portion 58 of the seal element 54 into tighter, more positive sealing engagement with the peripheral sealing portion 52 of the valve disc. In other words, the sealing portion 58 of the seal element is pressure enhanced or pressure responsive, and the sealing ability thereof is directly proportional to the magnitude of line pressure upstream of the closed butterfly valve element.

The outer peripheral portion of the annular seal element 52 is formed to define a pair of spaced sealing ribs 62 and 64 that establish mechanical sealing contact with the upstream and downstream valve body plates respectively. The annular ribs 62 and 64, together with the outer peripheral portion of the seal element disposed therebetween, function to bridge the joint 66 that is established between the abutting upstream and downstream valve body plates 14 and 16. The mechanical seal that is established between the sealing ribs 62 and 64 against the respective valve body plates functions to prevent leakage at low valve pressures. The pressurized fluid medium controlled by the valve and acting within the annular groove 60 defined by the base portion of the seal element will act upon the outer peripheral portion of the seal element, thereby causing the seal developed between the seal element and the upstream and downstream valve body plates to be materially enhanced by line pressure. The annular sealing element is therefore pressure enhanced, not only to increase the sealing ability thereof but also to enhance the valve body joint seal that is established thereby.

Referring now to FIGS. 2 and 3, the upstream and downstream valve body plates 14 and 16 are formed to define generally semi-cylindrical grooves such as shown at 68, 70, 72 and 74. At the upper portion of the valve body, as shown in FIG. 3, the semi-cylindrical stem grooves 68 and 72 cooperate to define a generally cylindrical stem passage 74 within which may be received a valve disc actuating stem 76. The actuating stem 76 may be provided with a non-circular head portion 78 providing for connection of any suitable valve-actuating wrench, hand wheel or other actuating device to the free extremity of the valve stem. The inner portion of the valve actuating stem is also provided with a non-circular portion 80 that establishes a non-rotatable relationship with the valve disc 50. Rotation of the valve actuating stem 76 therefore induces rotation to the valve disc between the open and closed positions thereof. The stem passage defined by the interfitting upstream and downstream valve body plates is also formed to define an annular stem retainer groove 82 within which may be received a thrust shoulder 84 formed on the valve stem. Fluid pressure within the flow passage of the valve will act upon the cross-sectional dimension of the valve stem and will induce a force that urges the valve stem outwardly. This pressure induced force is transmitted from the valve stem through the thrust shoulder 84 to the valve body plates by virtue of the interconnected relationship between the thrust flange 84 and the annular groove 82. The annular groove 82 and thrust shoulder 84 function cooperatively to prevent the body plates 14 and 16 from becoming misaligned. The annular thrust shoulders of the valve stem and trunnion function to establish a locking relationship with the body plates. With the thrust shoulders positioned within the respective retainer grooves, the stem and trunnion will positively orient the body plates and prevent them from becoming misaligned.

The valve disc is also supported at its lower portion by means of a trunnion element 86 that is received within a generally cylindrical trunnion passage 88 established by the generally semi-cylindrical grooves 70 and 74 that are defined in the upstream and downstream valve plates. A thrust shoulder 90 formed on the trunnion element 86 may be received within an annular groove 92 with the thrust flange 90 serving to transmit pressure induced forces from the trunnion to the valve body plate structure in the same manner as discussed above in connection with the valve stem 76. Both the valve stem and the trunnion are therefore blowout-proof by virtue of their thrust flange interconnection with the valve body defined by the valve plates. The valve disc 50 may have a rotatable relationship with the supporting portion 94 of the trunnion element 86.

For the purpose of preventing leakage of line fluid along the valve stem and trunnion, it is desirable to provide an efficient seal that functions throughout the pressure range of valve operation. Since the valve stem and trunnion are located in the valve body structure in such manner as to intersect the annular seal chamber or pocket, the seal element 54 may be provided with stem and trunnion seal portions 96 and 98 respectively. The stem and trunnion portions of the seal element define annular lips that are in engagement with the stem and trunnion. These lips are responsive to the pressure within the annular groove 60 to cause sealing contact between the lips and the stem and trunnion to be enhanced responsive to the magnitude of pressure acting within the seal element. The seal element therefore provides a third pressure-enhancing function by increasing the sealing ability of the stem and trunnion seals responsive to line pressure.

At times, it may be desirable to place the valve mechanism between pairs of pipe flanges and to secure the valve body structure between the flanges. For accomplishment of this purpose, each of the valve body plates is provided with a plurality of bolt apertures such as shown at 100 and 102, which apertures are disposed in registry, one with the other, and also may be placed in registry with bolt apertures 104 formed in the flange portion of the pipe section. To secure the valve mechanism in assembly with the flanges of the pipe section, bolts 26 may be inserted through the registering apertures of the pipe flanges and valve body and may be secured in tight intimate engagement therewith by means of nuts 27 that may be threaded onto the bolts. This manner of assembly is illustrated in FIG. 1.

It may be desirable to assemble the butterfly valve mechanism to a single pipe flange, thereby providing a valve closure at the extremity of a pipe section. In accordance with the present invention, this may be conveniently accomplished by forming the apertures 102 of the downstream valve body section with internal threads, as shown in FIG. 1, thereby providing that a threaded bolt extending through registering apertures in the pipe flange and the upstream valve body plate may have threaded engagement with the threaded apertures 102 of the downstream valve body plate, thereby positively securing the valve body plates in intimate, positively secured abutment with a single pipe flange. The valve mechanism in this case will function in the same manner as discussed above, with the annular seal element being pressure actuated to enhance the sealing engagement thereof with the valve disc, to enhance mechanical sealing thereof with the valve plates of the valve body and to provide for pressure enhanced sealing thereof with the operating stem and trunnion of the valve mechanism.

A valve mechanism constructed in accordance with the present invention is quite easily assembled and disassembled, causing initial assembly costs to be quite low and also allowing the valve mechanism to be quite simply and inexpensively repaired in the field. For purposes of assembly, the annular sealing element 54 is brought into assembly with one of the valve body plates 14 or 16. The valve disc 50 may then be located within the flow passage of the valve, and the stem and trunnion elements may be inserted through the stem apertures in the sealing element and into the respective stem and trunnion receptacles formed in the valve disc. After this has been accomplished, the remaining upstream or downstream valve body plate may be brought into abutting assembly with the remaining valve plate. The valve mechanism is considered complete at this point, but it is functional only when the upstream and downstream valve body plates are retained in assembly. This is accomplished, as discussed above, by connecting the valve mechanism between the flanges of pipe sections or by connecting the valve body structure to a single pipe flange. For replacement of the annular seal element or for accomplishment of other repair, the bolts may be removed and the valve body structure will simply slide from between the pipe flanges. This feature effectively eliminates any necessity for accomplishing mechanical spreading or alteration of the pipe sections and pipe flanges to allow removal of the valve mechanism. After the valve assembly has been repaired or replaced, it is simply placed between the pipe flanges or placed in abutment with a single flange and bolted connection is readily established.

In view of the foregoing, it is quite clear that the present invention provides a novel, high-pressure butterfly valve construction that includes a pressure actuatable seal element, the sealing ability of which is enhanced by line pressure. Line pressure also serves to enhance a valve body joint seal established by the outer peripheral portion of the seal element and to establish stem and trunnion seals to prevent leakage along the stem and trunnion elements of the valve mechanism. The valve body construction is designed for efficient and simple connection thereof between pipe flanges or for ready connection to a single pipe flange, as desired. The present invention is therefore well adapted to attain all of the features and advantages hereinabove set forth, together with other advantages which will become obvious and inherent from a description of the apparatus itself. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A high pressure butterfly valve having pressure enhanced sealing, said butterfly valve comprising:
    a valve body being connectable to a flow line and being formed to define a flow passage;
    said valve body defining an annular seal chamber having an annular seal aperture of smaller dimension than the dimension of said seal chamber;
    valve stem means being rotatably supported by said valve body and having a valve operating portion thereof extending externally of said valve body, said valve stem means having a butterfly disc engaging portion disposed within said flow passage;
    a butterfly element being positioned within said flow passage and being supported for rotation between open and closed positions by said valve stem means, said butterfly element having an outer periphery that is positioned in juxtaposed relation with said annular seal aperture in the closed position of said butterfly element;
    an annular sealing element being located within said seal chamber and being formed to define an annular pressure receiving base portion and a seal portion, said seal portion extending through said annular seal aperture into said flow passage and having sealing engagement with the periphery of said butterfly element in the closed position of said butterfly element;
    passage means being defined by said valve body and communicating fluid pressure from said flow passage upstream of said butterfly element to said seal chamber, said pressure receiving base portion defining an annular groove that faces upstream and receives fluid pressure from said passage means;
    said sealing portion of said sealing element being urged toward said periphery of said valve disc responsive to pressure acting within said annular groove; and
    stem seal means being formed integrally with said sealing element and being in sealing engagement with said valve stem means, the sealing ability of said stem seal means also being enhanced by fluid pressure within said annular groove.

2. A high pressure butterfly valve as recited in claim 1, wherein said valve body comprises:
    upstream and downstream valve body sections that cooperate to define said seal chamber, said valve body sections cooperating to define stem retainer means to retain said stem means in assembly with said valve body.

3. A high pressure butterfly valve as recited in claim 2, wherein:
    said passage means is formed in the upstream one of said valve body sections.

4. A high pressure butterfly valve as recited in claim 3, wherein:
   each of said valve body sections is of annular configuration and fits in side-by-side relation to define said valve body with a joint therebetween; and
   means interlocking said body plates and maintaining alignment of said valve body sections.

5. A high pressure butterfly valve as recited in claim 4, wherein:
   said sealing element establishes a seal at said joint between said upstream and downstream sections of said valve body.

6. A high pressure butterfly valve as recited in claim 1, wherein:
   thrust shoulder means is defined by said valve stem means; and
   stem retainer means is defined on said valve body and transmits any force induced to said stem means by pressure within said valve chamber to said thrust shoulder means, said stem retainer means interlocking said body sections and maintaining alignment of said valve body sections.

7. A high pressure butterfly valve as recited in claim 1, wherein said valve body comprises:
   upstream and downstream valve body sections being intimately joined, the joint therebetween being disposed in substantially normal relation to the direction of flow through said valve;
   said upstream and downstream valve body sections cooperating to define stem retainer means and said seal chamber, said stem means being received by said stem retainer means; and
   said sealing element establishing a seal with said upstream and downstream valve body sections and preventing leakage at said joint.

8. A high pressure butterfly valve as recited in claim 7, wherein:
   said upstream and downstream valve body sections are of annular plate-like configuration and are received in abutting relation between pipe flanges.

9. A high pressure butterfly valve as recited in claim 8, wherein:
   said valve body sections are formed to define connection apertures, said connection apertures being disposed in registry and being adapted for registry with bolt apertures of pipe flanges and receiving bolt means that retain said valve body in intimate assembly between pipe flanges.

10. A high pressure butterfly valve as recited in claim 9, wherein:
    said connection apertures of said downstream valve body section are internally threaded and are adapted to receive the threads of bolts to retain said valve body in assembly with a single pipe flange.

11. A high pressure butterfly valve as recited in claim 7, wherein:
    said connection apertures of said downstream valve body section are internally threaded and are adapted to receive the threads of bolts to retain said valve body in assembly with a single pipe flange.

12. A high pressure butterfly valve as recited in claim 7, wherein:
    said upstream and downstream valve body sections are formed to define annular groove means, said groove means cooperating upon assembly of said valve body sections to define said annular seal chamber and to define said annular seal aperture; and
    said pressure receiving base portion being of generally U-shape in cross-section defining an annular internal groove, said groove opening upstream and being in fluid communication with said passage means.

13. A high pressure butterfly valve as recited in claim 12, wherein:
    said base portion of said sealing element is formed to define a pair of spaced annular sealing ridges, said ridges each having sealing engagement with respective ones of said upstream and downstream valve body sections.

14. A butterfly valve construction adapted to be received in abutting relation between the flanges of pipe sections, said valve construction comprising:
    upstream and downstream valve body plates of generally flat configuration being disposed in abutment and defining a valve body having a body joint and having a flow passage;
    each of said plates being formed to define an annular seal receptacle and at least one valve support stem receptacle intersecting said seal receptacle, said seal receptacle defining an annular base portion and an annular seal opening, said base portion of said seal receptacle being of larger dimension than the dimension of said annular seal opening;
    said upstream valve body plate being formed to define passage means communicating said seal receptacle with said flow passage;
    stem means being received within said stem receptacle;
    valve plate means being supported within said flow passage by said stem means and being rotatable between open and closed positions to control the flow of fluid through said valve, said valve plate having a sealing periphery; and
    an annular deformable seal element being located within said seal receptacle, said seal element having a sealing portion located within said annular seal opening and adapted for sealing engagement with said sealing periphery of said valve plate means, said seal element having a base element located within said base portion of said seal receptacle, said base element being formed to define an annular groove opening upstream and being in communication with said passage means.

15. A butterfly valve construction as recited in claim 14, wherein:
    said base element is formed to define annular seal ridge means, said ridge means having sealing engagement with said upstream and downstream valve body plates and preventing leakage at said joint between said plates.

16. A butterfly valve construction as recited in claim 14, wherein:
    said seal element is formed to define stem seal means, said stem seal means having sealing engagement with said stem means, said stem seal means being exposed to pressure communicated through said passage means, sealing of said stem seal means being enhanced by said pressure.

17. A butterfly valve construction as recited in claim 14, wherein:
    said valve body plates are formed to define a trunnion receptacle being positioned in opposed relation with said stem receptacle; and a trunnion element is located within said trunnion receptacle and cooperates with said stem element to rotatably support said valve plate within said flow passage.

18. A butterfly valve construction as recited in claim 17, wherein:

said seal element is formed to define trunnion seal means having sealing engagement with said trunnion means, said trunnion seal means being exposed to pressure communicated through said passage means, sealing of said trunnion seal being enhanced by said pressure.

19. A butterfly valve construction as recited in claim 14, wherein:

bolt openings are formed in said upstream and downstream valve body plates; and said bolt openings of said downstream valve body plate are internally threaded and are adapted to receive the threads of bolts to retain said valve body in assembly with a single pipe flange.

* * * * *